US009295231B2

(12) United States Patent
Parness

(10) Patent No.: US 9,295,231 B2
(45) Date of Patent: Mar. 29, 2016

(54) MULTI ACTION PET PUZZLE TOY AND FOOD DISPENSER

(71) Applicant: Michael Parness, Foxfield, CO (US)

(72) Inventor: Michael Parness, Foxfield, CO (US)

(73) Assignee: THE KYJEN COMPANY, Centennial, CO (US)

( * ) Notice: Subject to any disclaimer, the term of this patent is extended or adjusted under 35 U.S.C. 154(b) by 55 days.

(21) Appl. No.: 14/322,924

(22) Filed: Jul. 3, 2014

(65) Prior Publication Data
US 2016/0000043 A1    Jan. 7, 2016

(51) Int. Cl.
*A01K 5/01* (2006.01)
*A01K 15/02* (2006.01)
*A01K 5/00* (2006.01)

(52) U.S. Cl.
CPC ............... *A01K 15/025* (2013.01); *A01K 5/00* (2013.01); *A01K 5/01* (2013.01); *A01K 5/0114* (2013.01)

(58) Field of Classification Search
CPC .......... A01K 5/00; A01K 5/01; A01K 5/0114
USPC ......... 119/51.01, 52.1, 52.4, 54, 55, 56.1, 57, 119/61.4
See application file for complete search history.

(56) References Cited

U.S. PATENT DOCUMENTS

| 2,773,474 | A | * | 12/1956 | Nugent | 119/55 |
| 3,083,687 | A | * | 4/1963 | Slaven | 119/52.2 |
| 3,174,459 | A | * | 3/1965 | Browne | 119/57.8 |
| 3,568,642 | A | * | 3/1971 | Hanby | 119/53.5 |
| 5,119,765 | A | * | 6/1992 | Roush, Jr. | 119/57.91 |
| 5,255,631 | A | * | 10/1993 | Anderson | 119/52.2 |
| 5,467,736 | A | * | 11/1995 | Reynolds | 119/52.2 |
| 5,479,879 | A | * | 1/1996 | Biek | 119/52.2 |
| 5,676,089 | A | * | 10/1997 | Morganson | 119/52.3 |
| 6,626,128 | B2 | * | 9/2003 | Romeu | 119/56.1 |
| 7,481,180 | B1 | * | 1/2009 | Snipes, Jr. | 119/51.5 |
| D676,202 | S | | 2/2013 | Hansen | |
| D676,203 | S | | 2/2013 | Hansen | |
| D676,619 | S | | 2/2013 | Hansen | |
| D697,676 | S | | 1/2014 | Hansen | |
| 8,752,508 | B2 | | 6/2014 | Taylor | |

* cited by examiner

*Primary Examiner* — David Parsley

(57) ABSTRACT

The invention comprises a novel pet puzzle toy and food dispenser in which treats are located in receptacles wherein retrieval requires the pet to both spin and rock the puzzle in order to obtain the food. Much like a child's teeter totter, the food will end up in the receptacle with the greater weight as a result of pressure applied by a pet. The pet is both rewarded and entertained.

1 Claim, 6 Drawing Sheets

MULTI ACTION PET PUZZLE TOY AND FOOD DISPENSER

FIELD

The invention relates to a novel pet puzzle toy and food dispenser in which treats are located in receptacles wherein retrieval requires the pet to both spin and rock the puzzle in order to obtain the food.

BACKGROUND OF THE INVENTION

The invention most closely corresponds with USPTO Class 119/702 wherein Class 119 relates to animal husbandry and sub-class 702 includes exercise or amusement devices for animals.

In its simplest form, the invention comprises a novel pet puzzle toy and food dispenser in which treats are located in receptacles wherein retrieval requires the pet to both spin and rock the puzzle in order to obtain the food. As in a teeter totter or see-saw.

It is well known in the animal behavior sciences that is a dog doesn't get the mental stimulation it needs it will develop behavior problems such as chewing, biting or elimination in the home due to boredom, stress or depression. Veterinary science has also determined that in addition to behavioral problems, a dog will also be more prone to diseases as the immune system can weaken due to stress or depression. Thus it is key to challenge a dog with activities such as the inventive puzzle.

THE INVENTION

Summary, Objects and Advantages

All who studied any form of psychology in school remember Pavlov's Dogs. A simple conditioning test resulted in dogs remembering or being cognitive of being given a treat when a bell was rung. Thus the dogs would respond in various cognitive ways when a bell was rung. This behavior presented itself for months after the actual tests were ceased. Pavlov evidenced that dogs actually had memory and the ability to react to certain stimuli on a consistent basis.

In the inventive toy, there are two "arms" which form the shape of a dog bone atop a gimbal which allows the bone to both rotate and pitch as in a teeter totter.

Below the bone portion a flanged perimeter dish aids in stabilization as well as catching a portion of spilled food.

The bone portion is hollow and in the center has an intake receptacle for a user to add food.

Treats will then respond to gravity and standard kinetics when such motion is initiated by the pet. Depending upon weight of dispensed food, the bone will tilt to the corresponding heavy side and the pet can consume the "treat".

BRIEF DESCRIPTION OF THE DRAWINGS

The invention is described in further detail by reference to five (5) drawings sufficient in detail to describe the invention in which.

DETAILED DESCRIPTION, INCLUDING BEST MODES OF CARRYING OUT THE INVENTION

Figure 1:
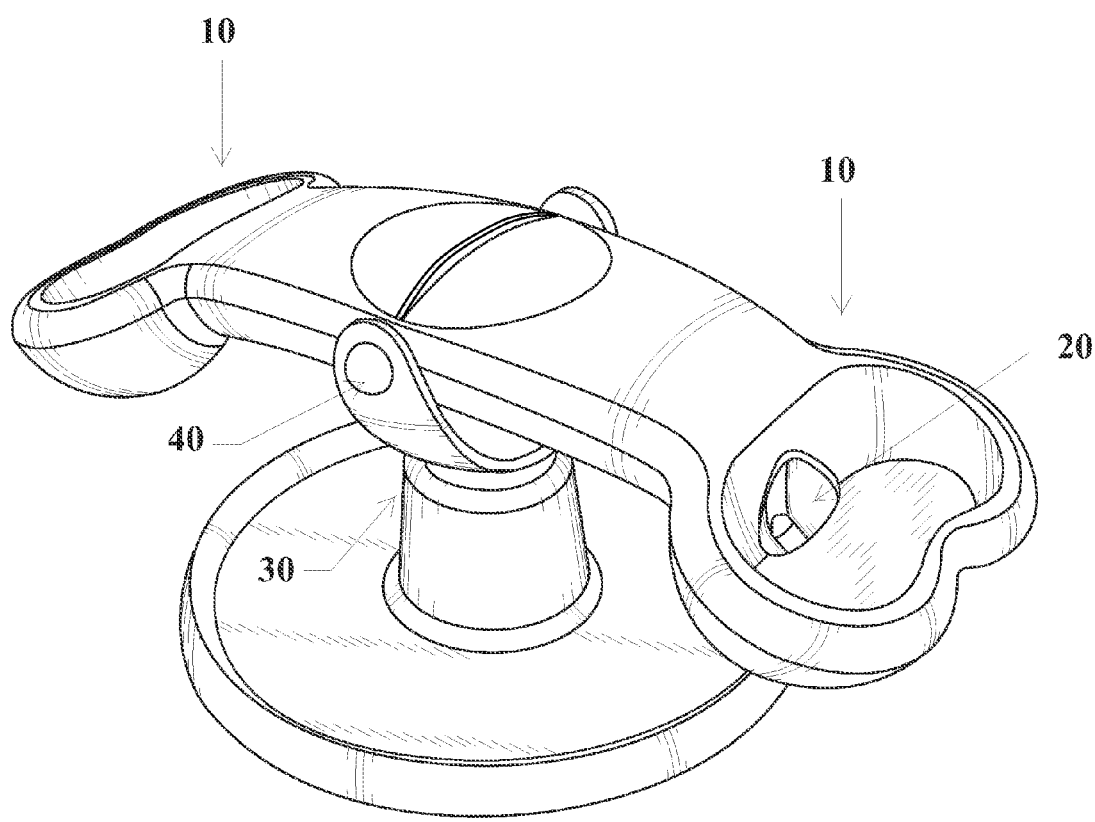
FIG. 1 is a perspective view of the puzzle toy at rest and sans food.

FIG. 1 illustrates the puzzle toy and food dispenser at rest and sans food. The bone shaped arms 10 have indentations wherein food will fall from an aperture 20 at each end of the bone and rest in the indentation. The bone rests on a gimbal and hinge set 30 which allows the bone portion to both rotate and hinge 40 toward the indentation that has the greatest weight. As in a child's teeter totter. A base 50 with a flanged perimeter aids in catch any food that drops as well as stabilizing the entire puzzle toy and food dispenser.

Figure 2:
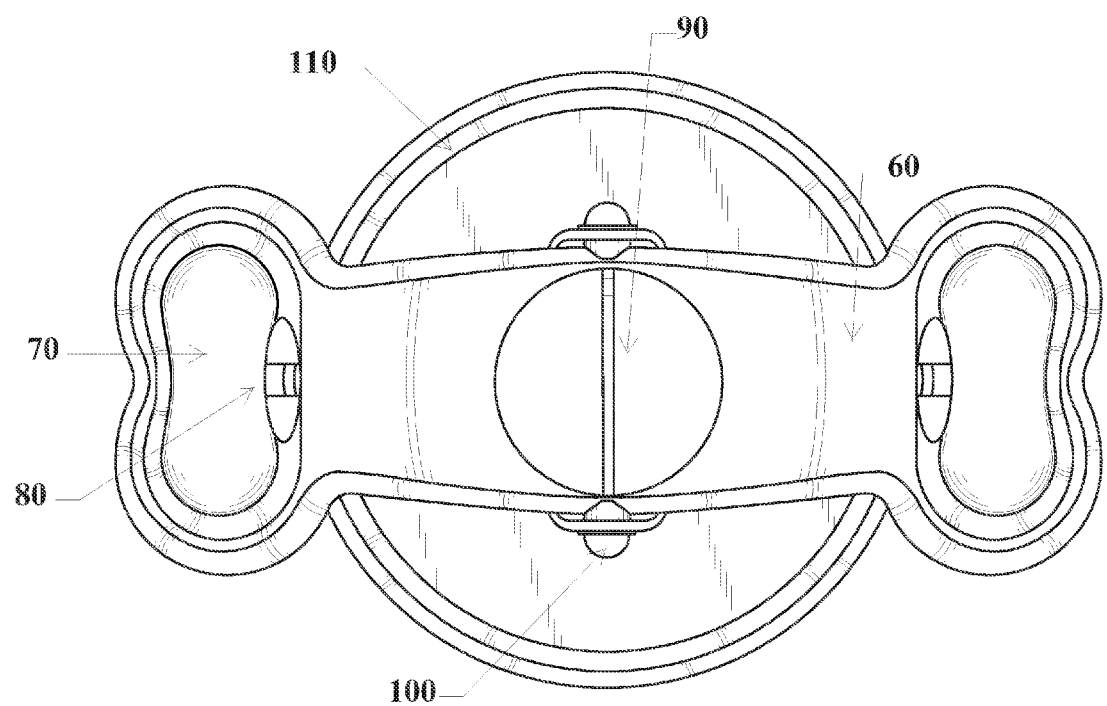
FIG. 2 is a top view of the puzzle toy illustrating the bone shape, and food receptacles.

FIG. 2 is an aerial view and shows the bone 60 and the receptacles 70 for food to be dispensed as a pet causes the bone to move downward. As the end with pressure applied moves downward, food kibbles will travel through the hollow bone portion and emit from apertures 80 located on each end of the bone. An aperture on top of the bone 90 allows a user to insert food which will then travel down one end of the bone or the other. The top of the gimbal hinge 100 is also viewed, and which allows the bone to tilt as well as rotate on the gimbal unseen in this view beneath. An aerial view of the base 110 illustrates the flanged perimeter to aid in catching food as well as stabilizing the puzzle toy and food dispenser.

Figure 3:
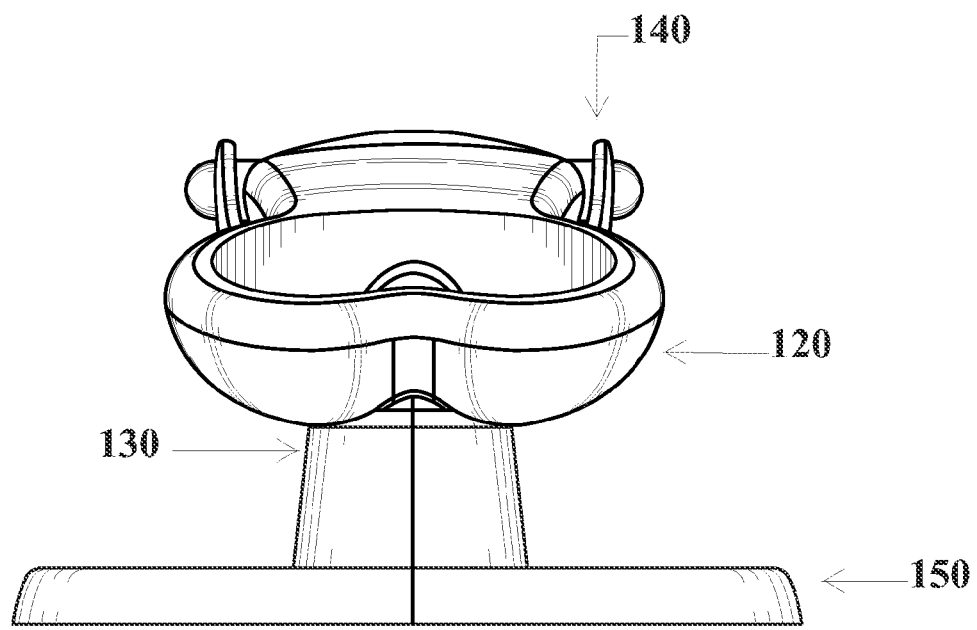
FIG. 3 is an end perspective showing the side of the bone, gimbal and base.

FIG. 3 is a side perspective showing an end of the bone portion 120, and the gimbal base 130. The hinges 140 for the tilting action are also shown from this end angle. The base 150 is shown in side view and illustrates the flanged perimeter from a pure side angle.

Figure 4:
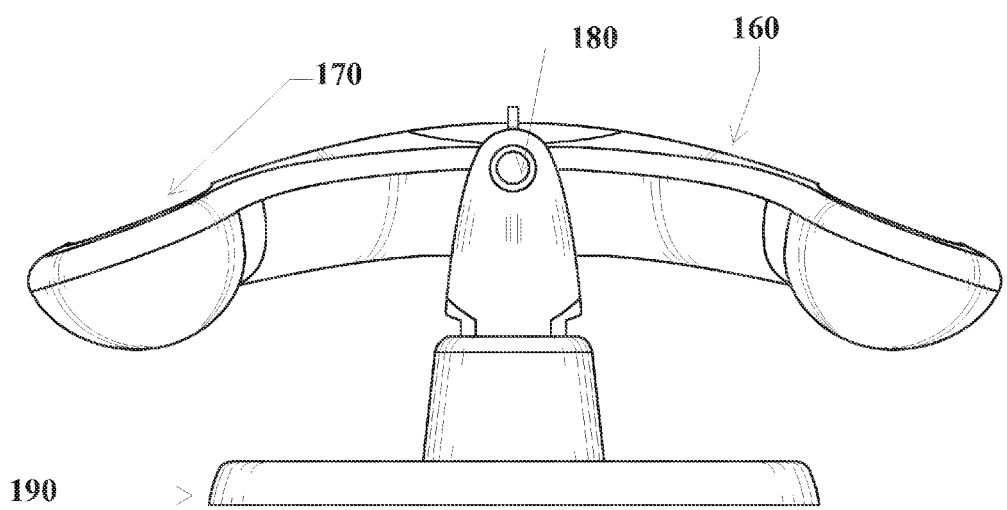
FIG. 4 is a side view of the bone portion, gimbal and base.

FIG. 4 illustrates a slight arc in the bone portion 160. This aids in food naturally rolling down one bone end 170 or another depending on which end a pet places pressure. The hinges will allow the tilt 180 and food will fall into the dispenser receptacles as gravity dictates. Again a side perspective of the base 190 provides clarity on the dimensions of the base as compared to the top portion of the pet puzzled toy and food dispenser, and would be immediately understood by anyone skilled in the art that balance is important to stability of the item. If there are no food kibbles in either receptacle, the pet also has to rotate the bone portion to then initiate pressure which releases the food.

Figure 5:
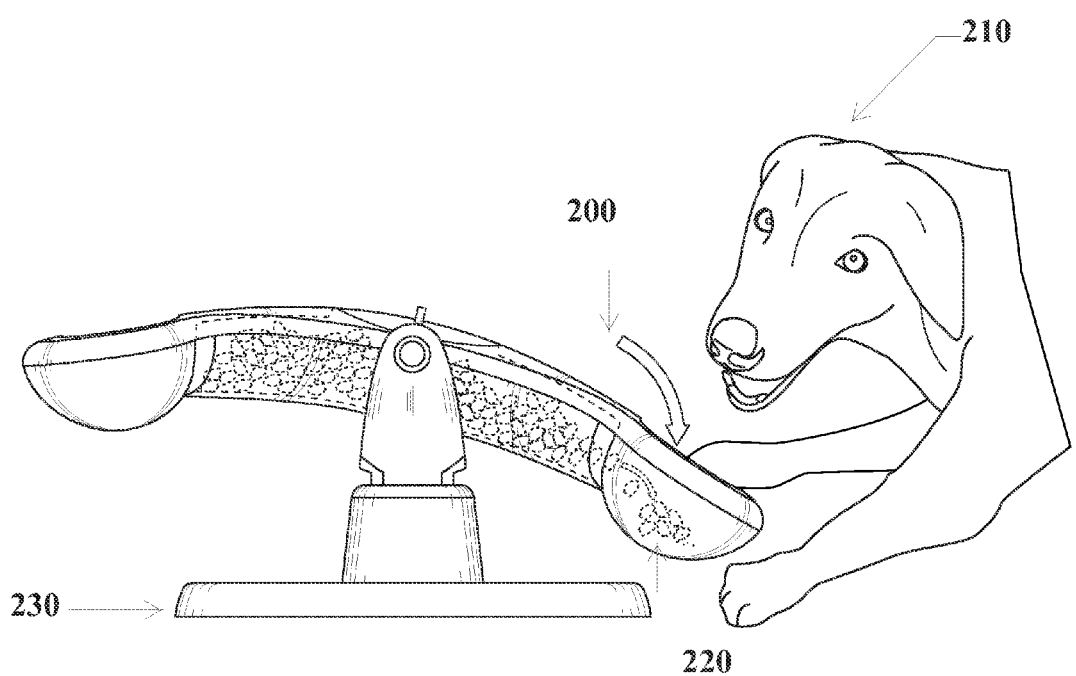
FIG. 5 is an illustration of a pet putting pressure on the "teeter totter"
Figure 6:
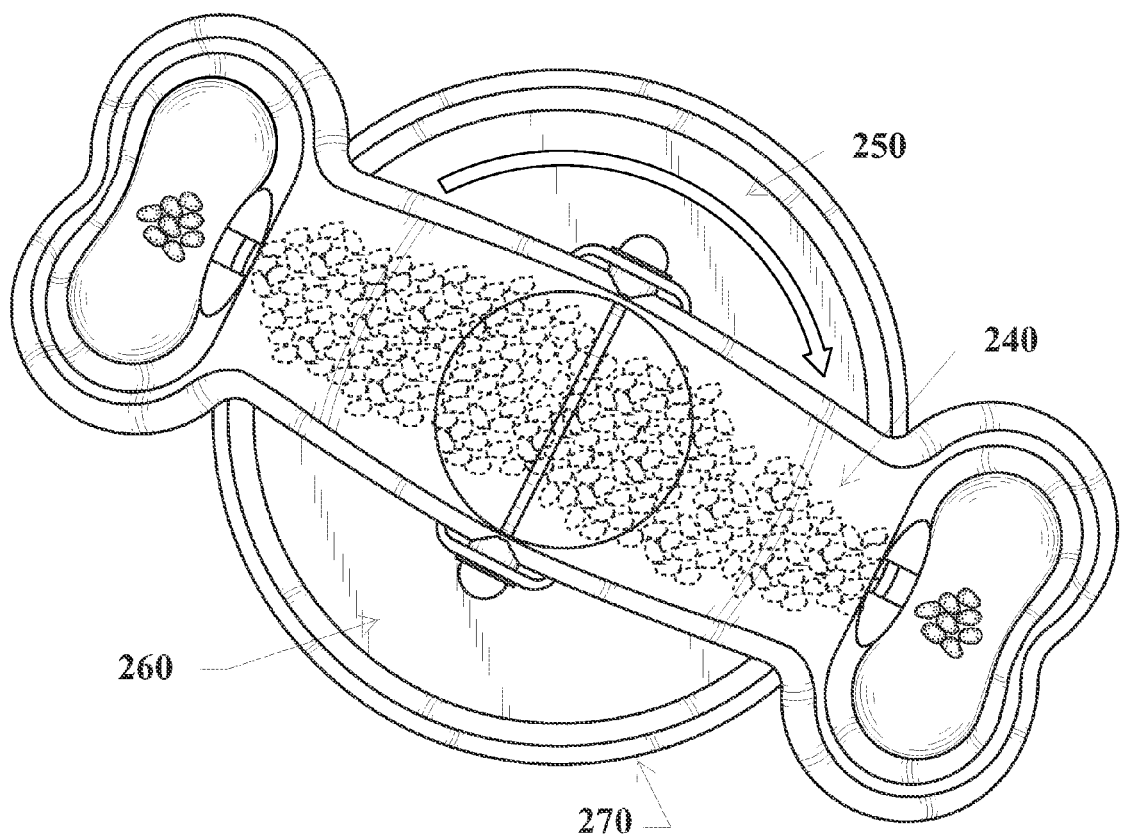
FIG. 6 is a top perspective showing how the food is held in the bone portion.

FIG. 5 is an example of the downward motion 200 as a result of pressure applied by a pet 210. As a result of the pressure applied, gravity will cause an appropriately higher number of food kibbles to roll towards the pet. The food will dispense in the receptacle 220 which rewards and amuses the pet. The base 230 is sufficiently sturdy so as to stabilize the entire puzzle toy and food dispenser, and a preferred embodiment will have a non-skid material on the bottom of the base.

Fig. is an aerial view of the puzzle toy and food dispenser with the food kibbles 240 in phantom for general perspective. The bone portion rotates clockwise 250 so as to lend familiarity and recognition patterns to the pet's interactions. Again the base 260 is shown and also reveals the flanged perimeter 270 which serves to aid in stabilizing the puzzle toy and catch dropped food kibbles. If equal weight is contained in both receptacles the pet will also have to determine which way to spin the bone portion, adding to the reasoning skills and memory of the pet.

The invention claimed is:

1. A pet puzzle toy and food dispenser comprising;
a) a base piece having a perimeter and a raised flange extending upwardly from the base along the perimeter,
b) a gimbal hinge affixed to a top of the base piece, the gimbal hinge having an elongated cylindrical portion extending upwardly from the top of the base piece and a u-shaped bracket portion affixed to the top of the cylindrical portion,
c) a hollow bone-shaped top piece moveably connected to the u-shaped bracket of the gimbal hinge via pin extending through the u-shaped bracket and the top piece, the top piece including a central hollow tunnel portion having first and second ends and an opening at each of the first and second ends, and two open food receptacles at each end of the hollow tunnel portion, each food receptacle in communication with each respective opening of the central hollow tunnel portion,
e) a covered aperture in the center of the central tunnel portion of the top piece adapted to allow a user to insert a desired amount of food into the central tunnel portion, and the moveable connection between the gimbal hinge and the top piece adapted to allow a pet to rotate and/or tilt the top piece with respect to the gimbal hinge and base piece to allow food inserted into the central tunnel portion of the top piece to move via gravity through the openings of the central hollow tunnel portion and into the receptacles.

* * * * *